United States Patent
Lee

(10) Patent No.: US 12,500,033 B2
(45) Date of Patent: Dec. 16, 2025

(54) MULTI-LAYER CERAMIC CAPACITOR INCLUDING METAL-CARBON COMPOSITE

(71) Applicant: SAMSUNG ELECTRONICS CO., LTD., Suwon-si (KR)

(72) Inventor: Choongjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 18/512,537

(22) Filed: Nov. 17, 2023

(65) Prior Publication Data

US 2024/0170222 A1 May 23, 2024

(30) Foreign Application Priority Data

Nov. 21, 2022 (KR) .................. 10-2022-0156789

(51) Int. Cl.
*H01G 4/008* (2006.01)
*H01G 4/012* (2006.01)
*H01G 4/30* (2006.01)
*H01G 4/12* (2006.01)

(52) U.S. Cl.
CPC ............. *H01G 4/008* (2013.01); *H01G 4/012* (2013.01); *H01G 4/30* (2013.01); *H01G 4/12* (2013.01)

(58) Field of Classification Search
None
See application file for complete search history.

(56) References Cited

U.S. PATENT DOCUMENTS

| | | |
|---|---|---|
| 9,520,234 B2 | 12/2016 | Kang et al. |
| 10,892,092 B2 | 1/2021 | Kim et al. |
| 10,892,093 B2 | 1/2021 | Kim et al. |
| 2012/0327558 A1 | 12/2012 | Jeong et al. |
| 2013/0038980 A1 | 2/2013 | Kim et al. |
| 2013/0045385 A1 | 2/2013 | Kim et al. |
| 2021/0005385 A1* | 1/2021 | Lee .................. H01G 4/012 |

FOREIGN PATENT DOCUMENTS

| | | | |
|---|---|---|---|
| JP | 2005079504 A | * | 3/2005 |
| JP | 2021-009919 A | | 1/2021 |
| KR | 10-2097329 B1 | | 4/2020 |

* cited by examiner

*Primary Examiner* — Eric W Thomas
(74) *Attorney, Agent, or Firm* — Fish & Richardson P.C.

(57) ABSTRACT

A multi-layer ceramic capacitor includes a ceramic body and an internal electrode formed inside the ceramic body and including a sintered structure of a metal-carbon composite and metal paste.

18 Claims, 8 Drawing Sheets

III

MULTI-LAYER CERAMIC CAPACITOR INCLUDING METAL-CARBON COMPOSITE

CROSS-REFERENCE TO RELATED APPLICATION

This application is based on and claims priority under 35 U.S.C. § 119 to Korean Patent Application No. 10-2022-0156789, filed on Nov. 21, 2022, in the Korean Intellectual Property Office, the disclosure of which is incorporated by reference herein in its entirety.

BACKGROUND

1. Field

Embodiments relate to a multi-layer ceramic capacitor.

2. Description of the Related Art

A multi-layer ceramic capacitor includes a plurality of stacked dielectric layers, a plurality of internal electrodes arranged opposite to each other with the dielectric layers therebetween, and an external electrode electrically connected to the internal electrodes. Such a multi-layer ceramic capacitor may have a large capacity despite its small size and may be easily mounted. Thus, multi-layer ceramic capacitors have been widely used as a component of an electronic device such as a computer, a mobile phone, or a control module. Recently, because chip components tend to have compact sizes and be highly functional according to the size reduction and multifunctionality of electronic devices, there is a demand for multi-layer ceramic capacitors with a small size and a large capacity.

SUMMARY

Embodiments provide a multi-layer ceramic capacitor that has a large capacity and a small thickness by using a sintered structure that could prevent internal electrodes from breaking during a sintering process of the internal electrodes.

Technical problems to be addressed herein are not limited to the above description. Other technical problems may be clearly understood by one of ordinary skill in the art from the descriptions provided hereinafter.

According to embodiments, there is provided a multi-layer ceramic capacitor including a ceramic body and an internal electrode formed inside the ceramic body and including a sintered structure that includes a metal-carbon composite and metal paste.

According to another embodiment, there is provided a multi-layer ceramic capacitor including a ceramic body that includes a plurality of internal electrodes arranged alternately with a plurality of dielectric layers, and an external electrode arranged on the ceramic body and connected to the plurality of internal electrodes, wherein each of the plurality of internal electrodes includes a sintered structure including a metal-carbon composite and metal paste.

According to another embodiment, there is provided a multi-layer ceramic capacitor including a ceramic body including a plurality of first internal electrodes and a plurality of second internal electrodes that are arranged alternately with a plurality of dielectric layers, and a first external electrode and a second external electrode that are arranged on edges of both sides of the ceramic body, wherein the first external electrode is connected to the plurality of first internal electrodes and the second external electrode is connected to the plurality of second internal electrodes, and wherein each of the plurality of first internal electrodes and the plurality of second internal electrodes includes a sintered structure of a nickel-carbon composite, in which nickel particles are bonded to a surface of a carbon nanotube, and nickel paste.

BRIEF DESCRIPTION OF THE DRAWINGS

Features will become apparent to those of skill in the art by describing in detail exemplary embodiments with reference to the attached drawings in which.

DETAILED DESCRIPTION

Hereinafter, one or more embodiments are described in detail with reference to the attached drawings.

Figure 1:
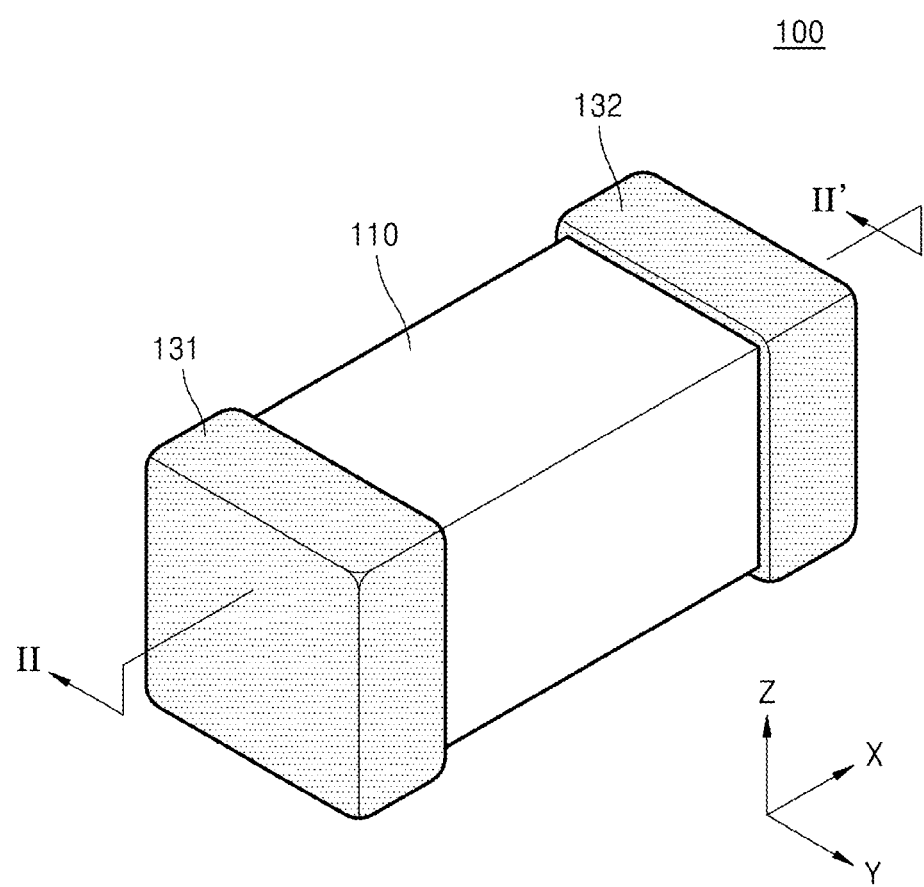
FIG. 1 is a perspective view of a multi-layer ceramic capacitor according to an embodiment.
Figure 2:
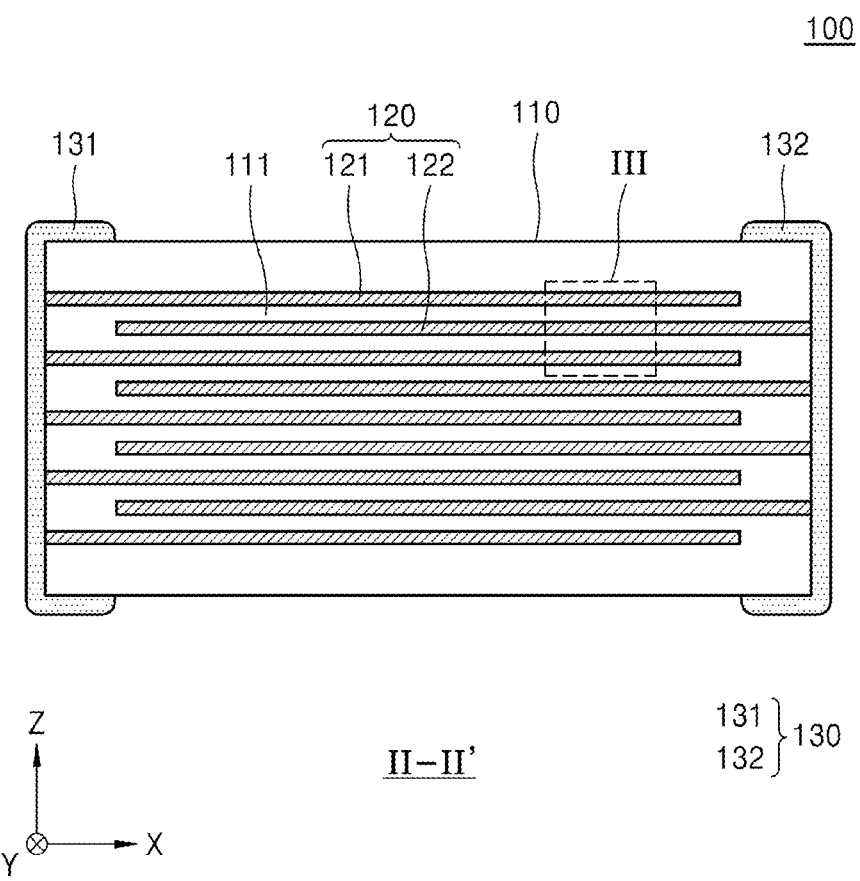
FIG. 2 is a cross-sectional view of the multi-layer ceramic capacitor taken along a line A-A' of FIG. 1.
Figure 3:
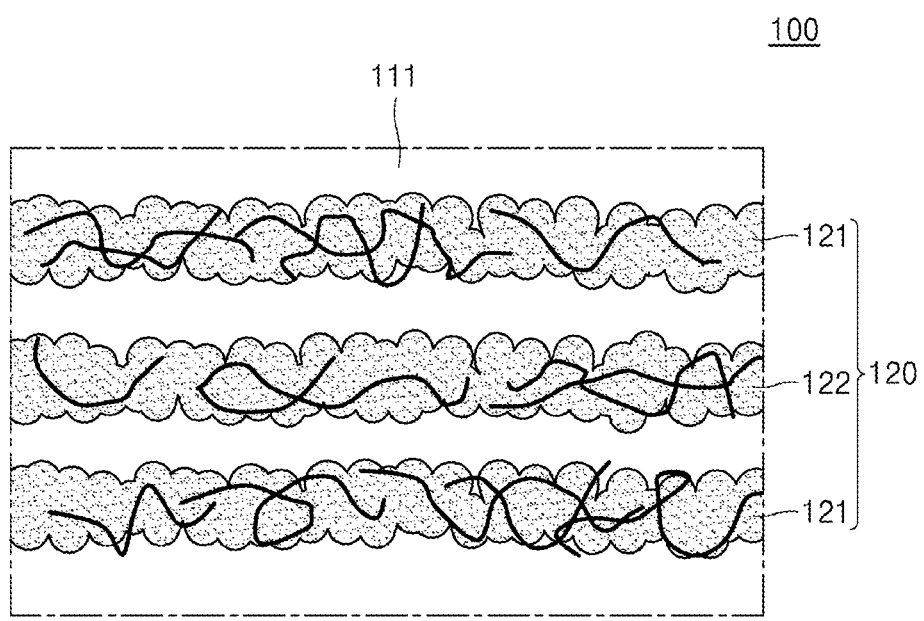
FIG. 3 is an enlarged cross-sectional view of region III of FIG. 2.

FIG. 1 is a perspective view of a multi-layer ceramic capacitor according to an embodiment, FIG. 2 is a cross-sectional view of the multi-layer ceramic capacitor taken along a line A-A' of FIG. 1, and FIG. 3 is an enlarged cross-sectional view of region III of FIG. 2.

FIGS. 1 to 3 depict a multi-layer ceramic capacitor 100 that includes a ceramic body 110 and an internal electrode 120 that is formed inside the ceramic body 110. The internal electrode 120 has a sintered structure including a metal-carbon composite and metal paste.

The ceramic body 110 may include an active layer that contributes to forming a capacity of a capacitor, and upper and lower cover layers respectively formed on and under the active layer as upper and lower margin areas. The active layer may include a dielectric layer 111 and the internal electrode 120.

In some embodiments, there is no specific limitation on the shape of the ceramic body 110. In some implementations, the ceramic body 110 may have a substantially hexahedral shape.

When a chip is sintered, the shape of the ceramic body 110 may not be in a form of a complete hexahedron because of sintering shrinkage of ceramic powder, a thickness difference resulting from the existence of an internal electrode pattern, and abrasion of edge portions of the ceramic body 110, but the shape may be substantially a hexahedron.

When directions of the hexahedron are defined clearly, an X direction, a Y direction, and a Z direction shown in the drawings may indicate a lengthwise direction, a widthwise direction, and a thickness direction, respectively. The thickness direction may be substantially the same as the stack direction in which the dielectric layers 111 are stacked.

The internal electrode 120 may include a first internal electrode 121 and a second internal electrode 122. The first internal electrode 121 and the second internal electrode 122 may face each other with the dielectric layer 111 therebetween. The first internal electrode 121 and the second internal electrode 122 may provide a pair of electrodes having different polarities. The first internal electrode 121 and the second internal electrode 122 have certain thicknesses on the dielectric layer 111, and may each be a sintered structure. The sintered structure is described below in detail.

The first internal electrode 121 and the second internal electrode 122 may be formed to be alternately exposed through both cross-sections of the ceramic body 110 along the stack direction of the dielectric layers 111. The first internal electrode 121 and the second internal electrode 122 may be insulated from each other by the dielectric layers 111 arranged between the first internal electrode 121 and the second internal electrode 122.

The first internal electrode 121 and the second internal electrode 122 may be electrically connected to an external electrode 130 through the portions of the first internal electrode 121 and the second internal electrode 122 which are alternately exposed through the cross-sections of the ceramic body 110. In more detail, the external electrode 130 may include a first external electrode 131 and a second external electrode 132. The first internal electrode 121 may be electrically connected to the first external electrode 131, and the second internal electrode 122 may be electrically connected to the second external electrode 132.

Therefore, electric charges may accumulate between the first internal electrode 121 and the second internal electrode 122, which face each other, while voltages are applied to the first external electrode 131 and the second external electrode 132. In this case, a capacitance of the multi-layer ceramic capacitor 100 may be proportional to an area of a region where the first internal electrode 121 overlaps the second internal electrode 122.

The thicknesses of the first internal electrode 121 and the second internal electrode 122 may be determined depending on their use. For example, a thickness of the dielectric layer 111 may be arbitrarily changed or selected according to a capacity design of the multi-layer ceramic capacitor 100. Also, metal included in a metal-carbon composite forming the first internal electrode 121 and the second internal electrode 122 may be any metal selected from among silver (Ag), copper (Cu), nickel (Ni), tin (Sn), and gold (Au), as non-limiting examples.

The dielectric layer 111 may include a ceramic powder that has high dielectric constants, for example, a barium titanate ($BaTiO_3$)-based powder or a strontium titanate ($SrTiO_3$)-based powder, aa non-limiting examples.

An uppermost region and a lowermost region of the dielectric layer 111 may include the same material, and have the same structure, as the dielectric layer 111 in other regions, except that the uppermost region and the lowermost region do not include the internal electrode 120. The uppermost region and the lowermost region may be formed as a single dielectric layer or a stack of at least two dielectric layers in a vertical direction. The uppermost region and the lowermost region may prevent damage to the first internal electrode 121 and the second internal electrode 122 that could be caused by physical or chemical stress.

To describe the external electrode 130 in detail, the first external electrode 131 and the second external electrode 132 may be directly connected to the first internal electrode 121 and the second internal electrode 122, respectively. Thus, electrical conduction may be secured between the inside and the outside of the multi-layer ceramic capacitor 100.

The first external electrode 131 and the second external electrode 132 may each include conductive metal. The conductive metal may include Ni, Cu, palladium (Pd), Au, or an alloy thereof, as non-limiting examples. In some embodiments, the first external electrode 131 and the second external electrode 132 may each be a sintered electrode formed by sintering a paste that includes the conductive metal.

In the present specification, with respect to the external electrode 130, a direction in which the ceramic body 110 is placed is defined as an inner side, and a direction in which the ceramic body 110 is not placed is defined as an outer side.

The internal electrode 120 may include a metal particle including at least one selected from among Ag, Cu, Ni, Sn, and Au. The metal particle may have a spherical shape or a flake shape.

The internal electrode 120 may include allotropes of carbon. For example, the metal particle as described above may be attached to or arranged on an outer surface of the allotropes of carbon. Thus, the electrical conductivity of the internal electrode 120 may increase. For example, the internal electrode 120 may be formed to have a sintered structure of a metal-carbon composite and metal paste.

In detail, the allotropes of carbon included in the metal-carbon composite forming the internal electrode 120 may be any one selected from among a carbon nanotube, carbon fibers, and graphene. The metal included in the metal-carbon composite may be any metal selected from among Ag, Cu, Ni, Sn, and Au.

In some embodiments, the metal included in the metal paste may be substantially the same as the metal included in the metal-carbon composite. For example, the metal-carbon composite may be a composite in which Ni particles are bonded to a surface of the carbon nanotube, and the metal paste may be a Ni paste.

In other embodiments, the metal included in the metal paste may be any one metal selected from among Ag, Cu, Ni, Sn, and Au. The metal included in the metal paste may be different from the metal included in the metal-carbon composite. For example, the metal-carbon composite may be a composite in which Sn particles are bonded to the surface of the carbon nanotube, and the metal paste may be the Ni paste.

As described below, the metal-carbon composite may have a structure in which metal is grown on a network structure of carbon itself, according to a nucleation method by using the network structure of carbon itself. In the case of the nucleation method, the metal-carbon composite may be formed through multiple reduction processes, as non-limiting examples.

In general, the multi-layer ceramic capacitor 100 may include a plurality of stacked dielectric layers 111, a plurality of internal electrodes 120 arranged opposite to each other with the dielectric layers 111 therebetween, and an external electrode 130 electrically connected to the internal electrodes 120. The multi-layer ceramic capacitor 100 may have a large capacity despite its small size and may be easily mounted. Thus, the multi-layer ceramic capacitor has been widely used as a component of an electronic device, such as a computer, a mobile phone, or a control module. Recently, because components of a chip tend to have compact sizes and be highly functional according to the size reduction and multifunctionality of electronic devices, there is a demand for multi-layer ceramic capacitors 100 with small sizes and large capacities.

According to a method of manufacturing a general multi-layer ceramic capacitor 100, the ceramic body 110 and the internal electrodes 120 may be formed through a co-sintering process. In this case, because of a mismatch between a sintering temperature difference and a coefficient of linear expansion, where the sintering temperature difference is caused by a difference in materials forming the ceramic body 110 and the internal electrodes 120 during the co-sintering process, that is, because of a difference between an insulating material and a conductive material, materials forming the internal electrodes 120 may shrink. Because of the shrinkage, cracks could appear between conductive materials forming the internal electrodes 120. Such cracks could be generated due to discontinuous surfaces and/or voids. Discontinuous surfaces and/or voids in the internal electrodes 120 may increase according to the thickness reduction of the internal electrodes 120.

To address this issue, the multi-layer ceramic capacitor 100 may be formed to have a large capacity and a reduced thickness by using a sintered structure that includes the metal-carbon composite. The sintered structure may prevent the breakage of the internal electrodes 120. For example, discontinuous surfaces and/or voids, may occur due to shrinkage during the sintering process of the internal electrodes 120.

Figure 4:
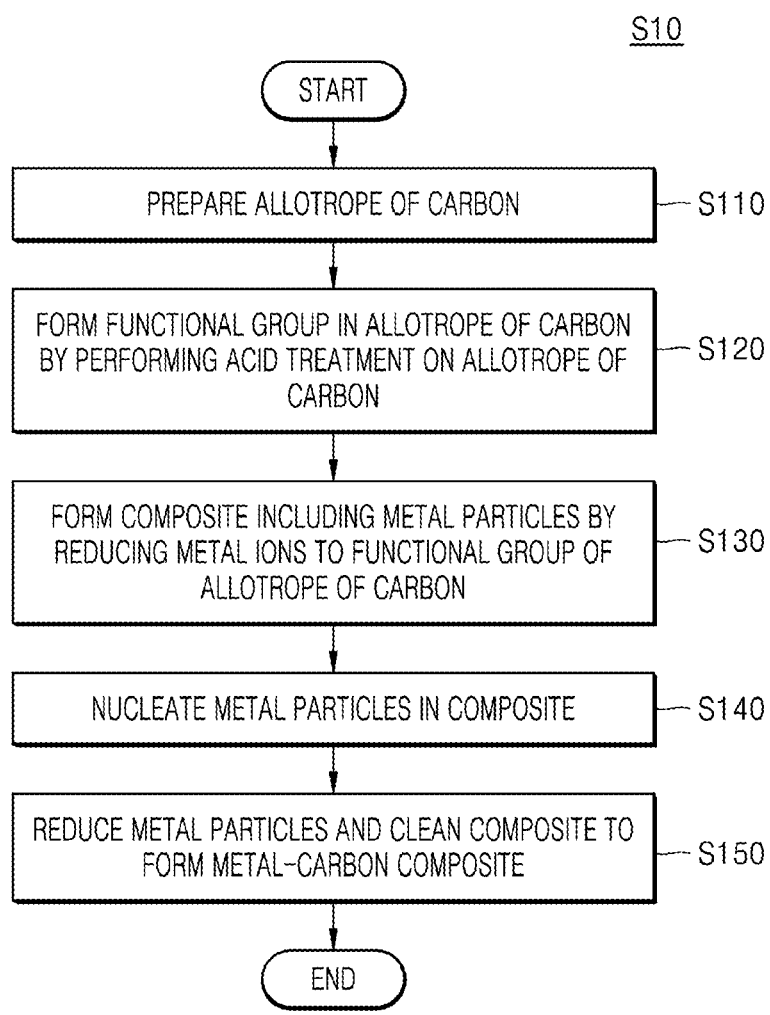
FIG. 4 is a flowchart of a method of manufacturing a multi-layer ceramic capacitor, according to an embodiment.

FIG. 4 is a flowchart of a method of manufacturing a multi-layer ceramic capacitor, according to an embodiment.

Referring to FIG. 4, a method S10 of manufacturing a multi-layer ceramic capacitor may include operations from a first operation S110 to a fifth operation S150.

In some implementations, a specific process order may be performed differently from the order shown in FIG. 4. For example, two consecutively described processes may be performed at substantially the same time or may be performed in an order opposite to the described order.

The method S10 of manufacturing a multi-layer ceramic capacitor may include a method of forming a metal-carbon composite. In detail, the first operation S110 for preparing allotropes of carbon, the second operation S120 for treating the allotropes of carbon with acid, the third operation S130 for reducing metal ions to a functional group of the allotropes of carbon and synthesizing a composite in which metal particles are formed, the fourth operation S140 for nucleating the metal particles in the composite, and the fifth operation S150 for forming the metal-carbon composite by cleaning the composite.

Technical features of each of the first to fifth operations S110 to S150 are described in detail with reference to FIG. 5.

Figure 5:
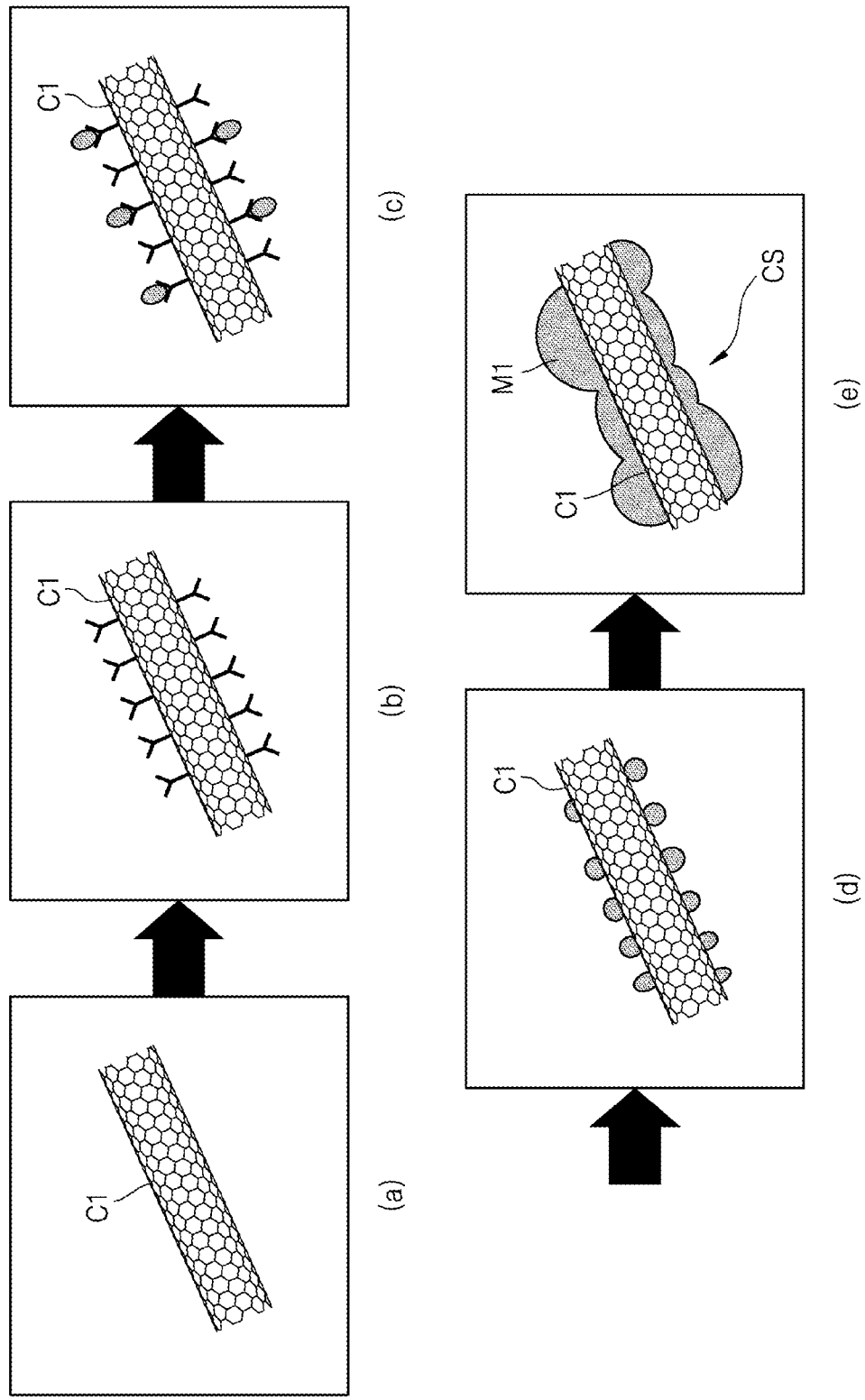
FIG. 5 is a conceptual view of manufacturing processes of a multi-layer ceramic capacitor, according to an embodiment.

FIG. 5 is a conceptual view of manufacturing processes of a multi-layer ceramic capacitor, according to an embodiment.

For convenience of explanation, a carbon nanotube is shown as an allotrope of carbon C1, but the allotrope of carbon C1 may not be limited to what is shown. For example, the allotrope of carbon C1 may be a carbon fiber or graphene. That is, the allotrope of carbon C1 is not particularly limited as long as the allotrope of carbon C1 includes a material having a network structure of carbon itself.

FIG. 5 shows a schematic diagram of each stage of the manufacturing process of an allotrope of carbon and a metal-carbon composite including a diagram of a metal attached to a surface of the allotrope of carbon, and an image of completion.

First of all, as shown in (a) of FIG. 5, the allotrope of carbon C1 may be prepared. The allotrope of carbon C1 may have excellent thermal conductivity, electrical conductivity, and mechanical characteristics. In accordance with the use and purpose of the prepared metal-carbon composite, the allotrope of carbon C1 having an appropriate size, volume, etc. may be used. The allotrope of carbon C1 may be manufactured according to various methods. For example, Chemical Vapor Deposition (CVD) may be used.

As shown in (b) of FIG. 5, an acid treatment may be performed on the allotrope of carbon C1. The acid treatment includes adding acid to the allotrope of carbon C1 and attaching a functional group to the surface of the allotrope of carbon C1. The acid treatment is not particularly limited, and various acid treatment methods may be used. The acid used for the acid treatment may be sulfuric acid ($H_2SO_4$), nitric acid ($HNO_3$), or a sulfuric acid-nitric acid mixed solution, as non-limiting examples.

Then, as shown in (c) of FIG. 5, by adding the allotrope of carbon C1 to which the functional group is attached to a solution including a metal precursor, a composite in which the metal particles are bonded to the surface of the allotrope of carbon C1, may be manufactured. In the present specification, a liquid phase reduction process is referred to as a reduction process. Through the above reduction process, desired metals are attached to the allotrope of carbon C1. through the above reduction process. The generated metal particles may be reduced in a state such that the quantity and sizes of the metal particles are extremely small As shown in (d) of FIG. 5, the metal particles may be nucleated by treating the composite with a weak acid. The treatment of the composite with the weak acid may increase the contact of the weak acid with the composite. To this end, metal particles may be additionally reduced in the composite, and thus, a particle weight of metal may increase.

Lastly, as shown in (e) of FIG. 5, a first metal M1 may be formed by growing the sizes of the metal particles attached to the surface of the allotrope of carbon C1, and free particles may be minimized. Accordingly, the metal-carbon composite CS may be provided.

Additionally, a process for cleaning the metal-carbon composite CS may be provided. The cleaning process is not limited to a specific method, and various cleaning processes conforming to the purpose thereof may be used. Then, the cleaned metal-carbon composite CS may be dried. The drying process is not limited to a specific method, and various drying processes conforming to the intended purpose may be used.

According to the manufacturing processes, the metal-carbon composite CS may be provided. The metal-carbon composite CS may include the allotrope of carbon C1 and the first metal M1 attached to the surface of the allotrope of carbon C1. Accordingly, the metal-carbon composite CS may have great thermal and electrical conductivity.

Figure 6:
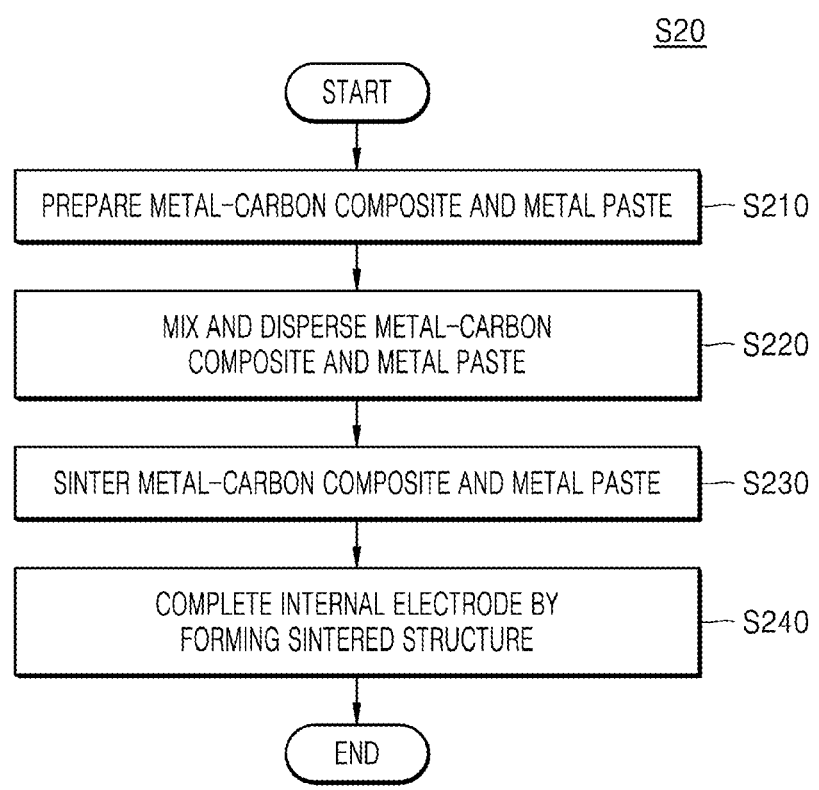
FIG. 6 is a flowchart of a method of manufacturing a multi-layer ceramic capacitor, according to an embodiment.

FIG. 6 is a flowchart of a method of manufacturing a multi-layer ceramic capacitor, according to an embodiment.

Referring to FIG. 6, a method S20 of manufacturing a multi-layer ceramic capacitor may include operations ranging from a first operation S210 to a fourth operation S240.

In some implementations, a specific process order may be performed differently from the described order. For example, two consecutively described processes may be performed at substantially the same time or performed in an order that is opposite to the described order.

The method S20 for manufacturing a multi-layer ceramic capacitor may include a first operation S210, in which a metal-carbon composite and metal paste are prepared, a second operation S220, in which the metal-carbon composite and the metal paste are mixed and dispersed, a third operation S230, in which the metal-carbon composite and the metal paste are sintered, and a fourth operation S240, in which an internal electrode is completed by forming a sintered structure.

Technical features of each of the first operation S210 to the fourth operation S240 are described in detail with reference to FIG. 7.

Figure 7:
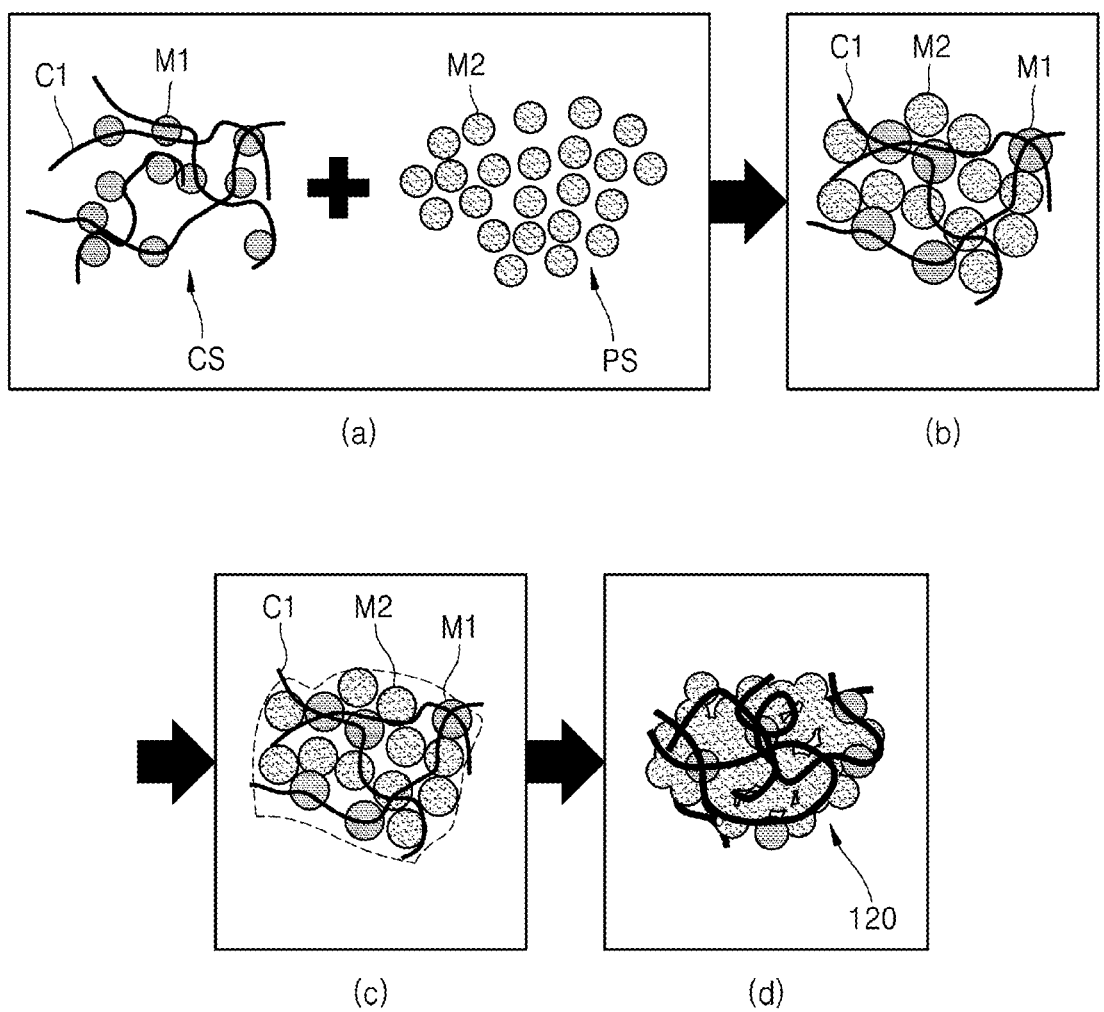
FIG. 7 is a conceptual view of manufacturing processes of a multi-layer ceramic capacitor, according to an embodiment.

FIG. 7 is a conceptual view of manufacturing processes of a multi-layer ceramic capacitor, according to an embodiment.

For convenience of explanation, a first metal M1 forming a metal-carbon composite CS is different from a second metal M2 forming metal paste M2, as non-limiting examples. In some implementations, the first metal M1 may include the same material as the second metal M2.

Also, for convenience of explanation, only a manufacturing process of the internal electrode 120 is illustrated, but one of ordinary skill in the art may manufacture the multi-layer ceramic capacitor (100, see FIG. 1) based on the description.

FIG. 7 shows a schematic diagram of each manufacturing process of a metal-carbon composite CS and metal paste PS, and an image of completion.

First of all, a plurality of ceramic green sheets may be prepared. The ceramic green sheet may be provided. The slurry may be formed by mixing a solvent with ceramic powder and a binder. The slurry may be formed into a sheet having a thickness of several micrometers (μm) according to a doctor blade method. The ceramic green sheet may be sintered in a subsequent process and may become a dielectric layer forming a ceramic body.

Then, as shown in (a) of FIG. 7, the metal-carbon composite CS and the metal paste PS for internal electrodes may be spread on the ceramic green sheet to form an internal electrode pattern. The internal electrode pattern may be formed according to a screen-printing method or a gravure printing method. Also, the metal-carbon composite CS may be manufactured according to the manufacturing method (S10, see FIG. 5) described above.

For example, the metal-carbon composite CS may include the first metal M1 grown on the surface of the allotrope of carbon C1. For example, because the specific components and structure of the metal-carbon composite CS are substantially the same as those described above, detailed descriptions thereof are not repeated.

In some embodiments, an average diameter of the second metal M2 included in the metal paste PS for forming the internal electrode 120 may be greater than an average diameter of the first metal M1 included in the metal-carbon composite CS. In other embodiments, the average diameter of the second metal M2 may be substantially the same as the average diameter of the first metal M1.

As shown in (b) of FIG. 7, the ceramic green sheets may be stacked and pressed in a direction in which the ceramic green sheets are stacked, and thus, the stacked ceramic green sheets, the metal-carbon composite CS, and the metal paste PS may be mixed and dispersed. The ceramic green sheets may be stacked in about 100 or more layers. According to the method described above, a ceramic laminate in which the ceramic green sheets, the metal-carbon composite CS, and the metal paste PS are alternately stacked, may be manufactured.

Next, as shown in (c) of FIG. 7, the ceramic laminate may be cut into respective portions corresponding to unit capacitors and manufactured in the chip form. In this case, the ceramic laminate may be cut such that end portions of the internal electrode 120 are exposed through a side surface of the ceramic laminate. Then, the ceramic laminate manufactured in the chip form may be sintered. In this case, because of a mismatch between a sintering temperature and a coefficient of linear expansion, the mismatch resulting from a difference in materials forming the ceramic green sheets and the internal electrode 120 during the sintering process, that is, for example, a difference between an insulating material and a conductive material, although materials forming internal electrodes, may shrink. The generation of discontinuous surfaces and voids may be restricted because of the metal-carbon composite CS.

Lastly, as shown in (d) of FIG. 7, the internal electrode 120 including the sintered structure may be completed, and an external electrode covering both edges of the ceramic body and electrically connected to the internal electrode exposed through the side surface of the ceramic body may be formed.

In addition, a surface of the external electrode may be plated with Ni, Sn, or the like, and thus, the multi-layer ceramic capacitor (100, see FIG. 1) may be manufactured.

The internal electrode 120 may be provided according to the manufacturing processes described above. The internal electrode 120 may include the sintered structure including the metal-carbon composite CS and the metal paste PS and may have great mechanical and electrical characteristics.

Figure 8:
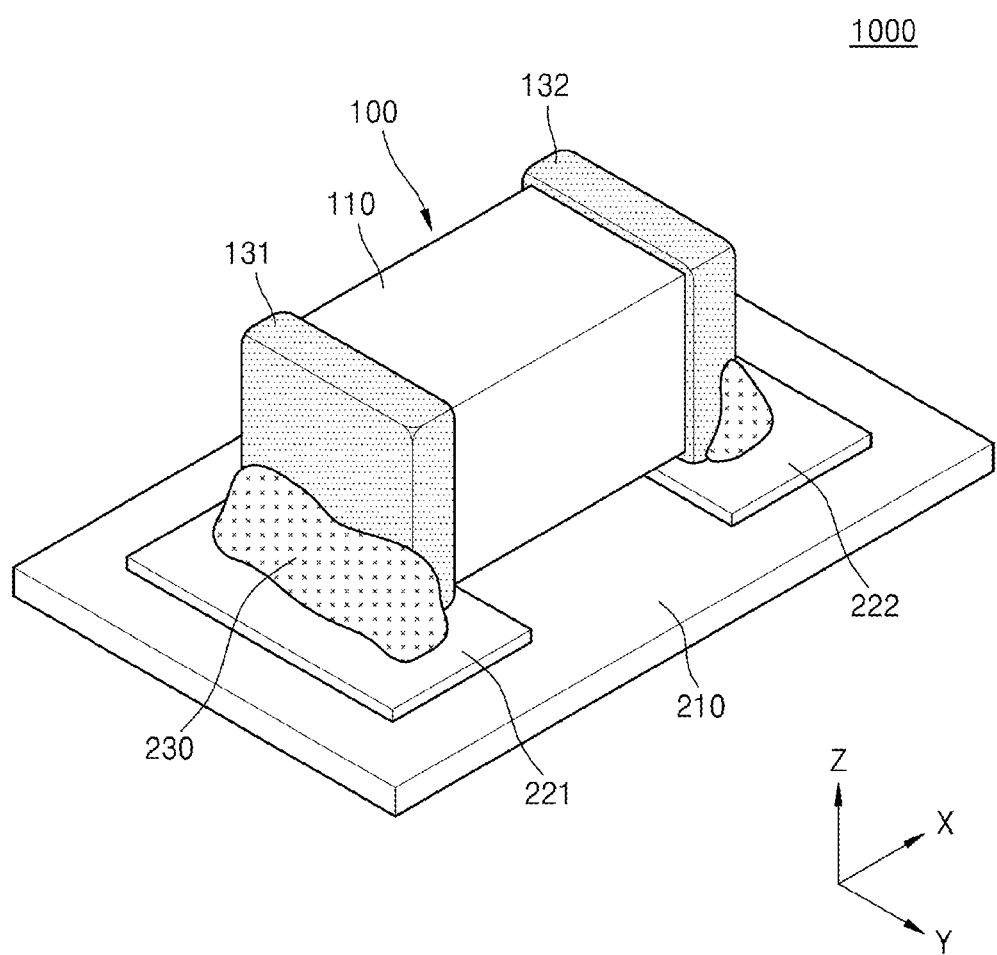
FIG. 8 is a perspective view of an electronic component on which a multi-layer ceramic capacitor is mounted, according to an embodiment.

FIG. 8 is a perspective view of an electronic component on which a multi-layer ceramic capacitor is mounted, according to an embodiment.

FIG. 8 shows an electronic component 1000 that includes a printed circuit board 210, which includes a first electrode pad 221 and a second electrode pad 222. The multi-layer ceramic capacitor 100 may be installed on the printed circuit board 210.

The printed circuit board 210 may include a body layer, an upper protective layer, and a lower protective layer. Wiring portions may be formed on the printed circuit board 210 and may be electrically connected to the multi-layer ceramic capacitor 100 through connection terminals. Also, a port may be arranged on the printed circuit board 210. The printed circuit board 210 may be electrically connected to a module substrate, a system board, a main board, and the like through the port and mounted.

A wiring portion having a single-layer structure or a multilayered structure may be formed in the body layer. Through the wiring portion, the body layer may be electrically connected to the multi-layer ceramic capacitor 100. The upper protective layer and the lower protective layer may protect the body layer and may include, for example, a solder resist.

Also, the body layer may be generally provided by compressing, at a certain thickness, a polymer material such as a thermosetting resin, an epoxy-based resin such as Flame Retardant 4 (FR-4), Bismaleimide Triazine (BT), or an Ajinomoto Build up Film (ABF), or a phenol resin, to make the body layer have a small thickness, coating both surfaces of the body layer with Cu foil, and forming a wiring portion that is a transmission path of electrical signals through a patterning process.

Also, the printed circuit board 210 may be classified into a single-layer PCB, on which wiring is formed on one surface, and a double-layer PCB, on which wiring is formed on both surfaces. Also, the Cu foil may be formed to have three or more layers by using an insulator such as a prepreg Three or more wiring layers may be formed according to the number of layers included in the formed Cu foil such that a multilayered PCB may be realized. Furthermore, the printed circuit board 210 may be a rigid PCB or a flexible PCB.

The first external electrode 131 and the second external electrode 132 of the multi-layer ceramic capacitor 100 may be electrically connected to the first electrode pad 221 and the second electrode pad 222, respectively. In detail, the first electrode pad 221 may be connected to the first external electrode 131 by an adhesive member 230. The second electrode pad 222 may be connected to the second external electrode 132 by the adhesive member 230.

As described, a multi-layer ceramic capacitor 100 may include a sintered structure with improved mechanical reliability. Based on characteristics of a composite material, the multi-layer ceramic capacitor 100 may be used in a rigid PCB or a flexible PCB. That is, the multi-layer ceramic capacitor 100 may be widely used in a manufacturing field of a flexible circuit.

By way of summation and review, embodiments provide a multi-layer ceramic capacitor that have a large capacity and a small thickness by using a sintered structure that may prevent internal electrodes from breaking during a sintering process of the internal electrodes.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A multi-layer ceramic capacitor, comprising:
   a ceramic body; and
   an internal electrode inside the ceramic body and including a sintered structure that includes a metal-carbon composite and a metal paste,
   wherein the metal-carbon composite includes metal grown on a network structure of carbon itself according to a nucleation method by using the network structure of the carbon itself.

2. The multi-layer ceramic capacitor as claimed in claim 1, wherein an allotrope of carbon in the metal-carbon composite includes any one selected from among a carbon nanotube, a carbon fiber, and graphene.

3. The multi-layer ceramic capacitor as claimed in claim 1, wherein metal in the metal-carbon composite includes any one selected from among silver (Ag), copper (Cu), nickel (Ni), tin (Sn), and gold (Au).

4. The multi-layer ceramic capacitor as claimed in claim 3, wherein metal in the metal paste is substantially the same as the metal in the metal-carbon composite.

5. The multi-layer ceramic capacitor as claimed in claim 4, wherein the metal-carbon composite includes a composite in which Ni particles are bonded to a surface of a carbon nanotube, and the metal paste includes Ni paste.

6. The multi-layer ceramic capacitor as claimed in claim 3, wherein metal in the metal paste is any one selected from among Ag, Cu, Ni, Sn, and Au, and the metal in the metal paste is different from the metal in the metal-carbon composite.

7. The multi-layer ceramic capacitor as claimed in claim 1, wherein the metal-carbon composite is formed through a plurality of reduction processes.

8. The multi-layer ceramic capacitor as claimed in claim 1, wherein the metal-carbon composite is configured to restrict generation of a discontinuous surface that could be caused by shrinkage of the metal paste.

9. The multi-layer ceramic capacitor as claimed in claim 1, wherein the ceramic body and the internal electrode are formed through co-sintering.

10. A multi-layer ceramic capacitor, comprising:
    a ceramic body including a plurality of internal electrodes arranged alternately with a plurality of dielectric layers; and
    an external electrode arranged on the ceramic body and connected to the plurality of internal electrodes,
    wherein each of the plurality of internal electrodes includes a sintered structure including a metal-carbon composite and a metal paste,
    wherein the metal-carbon composite is formed as a functional group that is bonded to a surface of a carbon nanotube and metal that is bonded to the functional group.

11. The multi-layer ceramic capacitor as claimed in claim 10, wherein the metal-carbon composite is formed as a plurality of metal particles that are attached to a single carbon nanotube.

12. The multi-layer ceramic capacitor as claimed in claim 10, wherein the metal-carbon composite is configured to improve electrical and mechanical characteristics by restricting generation of a discontinuous surface that could be caused by shrinkage of the metal paste.

13. The multi-layer ceramic capacitor as claimed in claim 12, wherein the metal-carbon composite is configured to induce an increase in efficiency of a sintering process and a prevention of cracks in the plurality of internal electrodes.

14. A multi-layer ceramic capacitor, comprising:
    a ceramic body including a plurality of first internal electrodes and a plurality of second internal electrodes that are arranged alternately with a plurality of dielectric layers; and
    a first external electrode and a second external electrode that are arranged on edges of both sides of the ceramic body, wherein the first external electrode is connected to the plurality of first internal electrodes and the second external electrode is connected to the plurality of second internal electrodes,
    wherein each of the plurality of first internal electrodes and the plurality of second internal electrodes includes a sintered structure of a nickel-carbon composite, in which nickel particles are bonded to a carbon nanotube surface, and nickel paste.

15. The multi-layer ceramic capacitor as claimed in claim 14, wherein the nickel-carbon composite includes a composite in which a functional group including sulfuric acid and/or nitric acid is formed on a carbon compound, nickel ions are reduced to the functional group, and nickel particles are bonded to a surface of the carbon compound.

16. The multi-layer ceramic capacitor as claimed in claim 15, wherein the nickel-carbon composite is formed by sintering and then cleaning the nickel particles.

17. The multi-layer ceramic capacitor as claimed in claim 16, wherein the nickel-carbon composite is configured to improve electrical and mechanical characteristics by restricting generation of a discontinuous surface, the generation being caused by shrinkage of the nickel paste.

18. The multi-layer ceramic capacitor as claimed in claim 17, wherein an average diameter of the nickel particle in the nickel-carbon composite is less than an average diameter of nickel powder in the nickel paste.

* * * * *